US011777991B2

(12) United States Patent
Strong et al.

(10) Patent No.: US 11,777,991 B2
(45) Date of Patent: Oct. 3, 2023

(54) FORECAST-BASED PERMISSIONS RECOMMENDATIONS

(71) Applicant: Amazon Technologies, Inc., Seattle, WA (US)

(72) Inventors: Homer Strong, Seattle, WA (US); Brigid Ann Johnson, Seattle, WA (US); Mathangi Ramesh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 17/107,082

(22) Filed: Nov. 30, 2020

(65) Prior Publication Data

US 2023/0216887 A1   Jul. 6, 2023

(51) Int. Cl.
*H04L 9/40* (2022.01)
*G06N 7/01* (2023.01)

(52) U.S. Cl.
CPC ............... *H04L 63/20* (2013.01); *G06N 7/01* (2023.01)

(58) Field of Classification Search
CPC .............................. H04L 63/20; G06N 7/005
See application file for complete search history.

(56) References Cited

U.S. PATENT DOCUMENTS

| | | | |
|---|---|---|---|
| 9,336,483 B1 * | 5/2016 | Abeysooriya | G06N 3/08 |
| 9,356,939 B1 | 5/2016 | Gates et al. | |
| 9,781,122 B1 | 10/2017 | Wilson et al. | |
| 10,095,549 B1 | 10/2018 | Needham et al. | |
| 10,122,757 B1 | 11/2018 | Kruse et al. | |
| 10,581,919 B2 | 3/2020 | Kruse et al. | |
| 10,944,758 B1 | 3/2021 | Nagargadde et al. | |
| 10,984,468 B1 | 4/2021 | Hockey et al. | |
| 10,992,657 B1 | 4/2021 | Stevens et al. | |
| 11,080,336 B2 * | 8/2021 | Van Dusen | G06Q 50/01 |
| 11,218,854 B2 * | 1/2022 | Raleigh | H04W 4/08 |
| 11,227,055 B1 | 1/2022 | Badawy et al. | |
| 2002/0165960 A1 | 11/2002 | Chan et al. | |

(Continued)

OTHER PUBLICATIONS

Chan et al. Introducing Aardvark and Repokid, AWS Least Privilege for Distributed, High-Velocity Development, Netflix Technology Blog, Jun. 5, 2017 (Year: 2017).*

(Continued)

*Primary Examiner* — Matthew Smithers
*Assistant Examiner* — Shu Chun Gao
(74) *Attorney, Agent, or Firm* — BakerHostetler

(57) ABSTRACT

A first permission allocated to a first identity may be identified. Permission usage information may be analyzed. The permission usage information may include permission usage history information and permission usage pattern data. An estimated probability of a future usage of the first permission by the first identity may be forecasted based, at least in part, on the permission usage information. A first recommendation relating to allocation of the first permission to the first identity may be determined based, at least in part, on the estimated probability. The first recommendation may be a recommendation for the first identity to retain the first permission or a recommendation to deallocate the first permission from the first identity. An indication of the first recommendation may be provided to a user.

20 Claims, 8 Drawing Sheets

(56) References Cited

U.S. PATENT DOCUMENTS

| | | |
|---|---|---|
| 2010/0277497 A1 | 11/2010 | Dong et al. |
| 2013/0132854 A1* | 5/2013 | Raleigh .................. G06F 3/0482 715/738 |
| 2013/0246208 A1 | 9/2013 | Jain et al. |
| 2014/0143332 A1 | 5/2014 | Garg et al. |
| 2014/0181965 A1 | 6/2014 | Kling et al. |
| 2014/0215604 A1 | 7/2014 | Giblin et al. |
| 2014/0289846 A1 | 9/2014 | Moloian et al. |
| 2014/0298423 A1 | 10/2014 | Moloian et al. |
| 2014/0325646 A1 | 10/2014 | Turgeman et al. |
| 2016/0307191 A1 | 10/2016 | Turgeman et al. |
| 2017/0201850 A1* | 7/2017 | Raleigh .................. H04W 4/50 |
| 2018/0027006 A1 | 1/2018 | Zimmerman et al. |
| 2018/0196955 A1 | 7/2018 | Dageville et al. |
| 2018/0365627 A1* | 12/2018 | Mansour ........ G06Q 10/063118 |
| 2019/0182262 A1 | 6/2019 | Raposa |
| 2020/0007555 A1 | 1/2020 | Jadhav et al. |
| 2020/0067861 A1 | 2/2020 | Leddy et al. |
| 2021/0117557 A1 | 4/2021 | Al-Shanqity et al. |
| 2021/0194884 A1 | 6/2021 | Xie et al. |
| 2021/0203687 A1 | 7/2021 | Rabin et al. |
| 2021/0218748 A1 | 7/2021 | Morin et al. |
| 2021/0243190 A1* | 8/2021 | Bargury .................. G06N 3/08 |
| 2022/0078797 A1 | 3/2022 | Helms et al. |
| 2022/0109677 A1 | 4/2022 | Bajaria et al. |
| 2022/0210162 A1 | 6/2022 | Agarwwal et al. |
| 2022/0368726 A1* | 11/2022 | Balasubramaniam ...................... H04L 63/1441 |

OTHER PUBLICATIONS

"IAM identifers"; web.archive.org/web/20201030115949/https://docs.aws.amazon.com/IAM/latest/UserGuide/reference_identifiers.html; Amazon Web Services, Inc.; web archive from Oct. 30, 2020; accessed Jun. 9, 2022; 8 pages.

Robertson et al.; "The Probabilistic Relevance Framework: BM25 and Beyond"; Foundation and Trends in Information Retrieval; vol. 3 No. 4; 2009; p. 333-389.

Robertson et al.; "Okapi at TREC-3"; Overview of the $3^{rd}$ Text Retrieval Conf.; Jan. 1995; 18 pages.

Jones et al.; "A probabilistic model of information retrieval: development and comparative experiments: Part 2"; Information Processing & Management; vol. 36; 2000; p. 809-840.

Valizadegan et al.; "Learning to Rank by Optimizing NDCG Measure"; In Advances in Neural Information Processing Systems; 2009; p. 1883-1891.

"Security Pillar—AWS Well-Architected Framework"; Amazon Web Services Inc.; Jul. 2020; 46 pages.

Brier et al.; "Verification of Forecasts Expressed in Terms of Probability"; Monthly Weather Review; vol. 78 No. 1; Jan. 1950; 3 pages.

Burks et al.; "Data Augmentation with Generative Models for Improved Malware Detection: A Comparative Study"; IEEE $10^{th}$ Annual Ubiquitous Computing, Electronics Mobile Communication Conf.; 2019; 7 pages.

Joseph Carson; "The 6 Most Disturbing Data Breaches in 2018"; https://thycotic.com/company/blog/2018/07/31/the-6-most-disturbing-data-breaches-in-2018-so-far/; Thycotic; Jul. 2018; accessed Dec. 11, 2021; 10 pages.

Che et al.; "Mode Regularized Generative Adversarial Networks"; arXiv:1612.02136; 2017; 13 pages.

Chen et al.; "MXNet: A Flexible and Efficient Machine Learning Library for Heterogeneous Distributed Systems"; arXiv:1512.01274; 2015; 6 pages.

Gemp et al.; "Weakly semi-supervised neural topic models"; ICLR Limited Labelled Data Workshop; 2019; 8 pages.

Goodfellow et al.; "Generative Adversarial Nets"; In Advances in Neural Information Processing Systems; 2014; p. 2672-2680.

"Risky Business #486—Locking down AWS permissions with RepoKid"; https://risky.biz/RB486/; Risky Business; Feb. 2018; accessed Dec. 11, 2021; 5 pages.

He et al.; "Deep Residual Learning for Image Recognition"; IEEE Conf. on Computer Vision and Pattern Recognition; 2016; p. 770-778.

Chan et al.; "Introducing Aardvark and Repokid"; https://netflixtechblog.com/introducing-aardvark-and-repokid-53b081bf3a7e; NetFlix; Jun. 2017; accessed Dec. 11, 2021; 7 pages.

Rezende et al. "Variational Inference with Normalizing Flows"; $32^{nd}$ Int'l Conf. on Machine Learning Research; 2015; p. 1530-1538.

Salimans et al.; "Improved Techniques for Training Gans"; In Advances in Neural Information Processing Systems; 2016; p. 2234-2242.

Snoek et al.; "Practical Bayesian Optimization of Machine Learning Algorithms"; In Adances in Neural Information Processing Systems; 2012; 12 pages.

Srivastava et al.; "Dropout: A Simple Way to Prevent Neural Networks from Overfitting"; Journal of Machine Learning Research; vol. 15; 2014; p. 1929-1958.

Sun et al.; "A Comparison Study of VAE and GAN for Software Fault Prediction"; Int'l Conf. on Algorithms and Architectures for Parallel Processing; Jan. 2020; p. 82-96.

Tolstikhin et al.; "Wasserstein Auto-Encoders"; arXiv1711.01558; 2019; 20 pages.

Turenko et al.; "Oversampling Versus Variational Autoencoders: Employing Synthetic Data for Detection of Heracleum Sosnowskyi in Satellite Images"; Information Science and Applications; May 2020; p. 399-409.

Wang et al.; "Safer Classification by Synthesis"; In NeurIPS Aligned AI Workshop; 2017; 12 pages.

Zhang et al.; "Over-Sampling Algorithm Based on VAE in Imbalanced Classification"; Int'l Conf. on Cloud Computing; 2018; p. 334-344.

Ribeiro et al.; ""Why Should I Trust You?" Explaining the Predictions of Any Classifier"; Proceedings of the $22^{nd}$ ACM SIGKDD Int'l Conf on Knowledge Discovery and Data Mining; Aug. 2016; p. 1135-1144.

Ribeiro et al.; "Anchors: High-Precision Model-Agnostic Explanations"; $32^{nd}$ AAAI Conf. on Artificial Intelligence; vol. 32; 2018; 9 pages.

Zhang et al.; "Interpreting Neural Network Judgments via Minimal, Stable, and Symbolic Corrections"; $32^{nd}$ Conf on Neural Information Processing Systems; 2018; 12 pages.

Madry et al.; "Towards Deep Learning Models Resistant to Adversarial Attacks"; Machine Learning; arXiv:1706.06083; 2018; 28 pages.

Tamer et al.; "The Space of Transferable Adversarial Examples"; Machine Learning; arXiv:1704.03453; 2017; 15 pages.

Wang et al.; "Formal Security Analysis of Neural Networks using Symbolic Intervals"; $27^{th}$ USENIX Security Symposium; 2018; 16 pages.

Guo et al.; "On Calibration of Modern Neural Networks"; Machine Learning; arXiv:1706.04599; 2017; 14 pages.

"Trie"; http://web.archive.org/web/20201121014636/https://en.wikipedia.org/wiki/ . . . ; Wikipedia; web archive from Nov. 21, 2020; accessed Jan. 25, 2022; 10 pages.

"Dawg documentation"; http://web.archive.org/web/20181220145725/https://dawg.readthedocs.io/en/lates . . . ; Wikipedia; web archive from Dec. 20, 2018, accessed Jan. 25, 2022; 14 pages.

"Okapi BM25"; http://web.archive.org/web/20201112014911/https://en.wikipedia.org/wiki/ . . . ; Wikipedia; web archive from Nov. 12, 2020; accessed Jan. 25, 2022; 4 pages.

"sklearn.calibration.CalibratedClassifierCV"; http://web.archive.org/web/20201112021039/https://scikit-learn.org/stable/modles/generated/sklearn.calibration.Calibra . . . ; scikit-learn developers; © 2007-2020; web archive from Nov. 12, 2020, accessed Jan. 25, 2022; 3 pages.

"Autoencoder"; http://web.archive.org/web/20201101012432/htps://en.wikipedia.org/wiki/ . . . ; Wikipedia; web archive from Nov. 1, 2020; accessed Jan. 25, 2022; 15 pages.

"Reinforcement learning"; http://web.archive.org/web/20201106232717/https://en.wikipeida.org/wiki/ . . . ; Wikipedia; web archive from Nov. 6, 2020; accessed Jan. 25, 2022; 13 pages.

(56) References Cited

OTHER PUBLICATIONS

"Reviewing and applying recommendations"; https://cloud.google.com/iam/docs/recommender-managing; Oct. 2020; accessed Oct. 21, 2020; 5 pages.
"Enforce least privilege with recommendations"; https://cloud.google.com/iam/docs/recommender-overview; Oct. 2020; accessed Oct. 20, 2020; 13 pages.
U.S. Appl. No. 17/104,984, filed Nov. 25, 2020, Strong.
U.S. Appl. No. 17/209,782, filed Mar. 23, 2021, Strong et al.
U.S. Appl. No. 17/218,570, filed Mar. 31, 2021, Strong.
Lipton; "The Mythos of Model Interpretability"; ICML Workshop on Human Interpretability in Machine Learning; 2017; 9 pages.
"Why should we use Temperature in softmax?"; http://web.archive.org/web/20201101200714/https://stackoverflow.com/questions/58764619/why-should-we-use-temperature-in-softmax; web archive from Nov. 1, 2020; accessed Jul. 6, 2022; one page.
"Create a custom analyzer"; web.archive.org/web/20201013023944/https://www.elastic.co/guide/en/elasticsearch/reference/current/analysis-custom-analyzer.html; Elasticsearch; © 2020; web archive from Oct. 13, 2020; accessed Jul. 1, 2022; 4 pages.
"Multi-armed bandit"; web.archive.org/web/20201029112217/https://en.wikipedia.org/wiki/Multi-armed_bandit; Wikipedia; web archive from Oct. 29, 2020; accessed Jul. 6, 2022; 19 pages.
"Viewing last accessed information for IAM"; web.archive.org/web/20201028103721/https://docs.awa.amazon.com/IAM/latest/UserGuide/access_policies_access-advisor-view-data.html; Amazon Web Services, Inc.; © 2020; web archive from Oct. 28, 2020; accessed Jul. 6, 2022; 5 pages.
"Similarity module"; web.archive.org/web/20200928065912/https://www.elastic.co/guide/en/elasticsearch/reference/current/index-modules-similarity.html; Elasticsearch; © 2020; web archive from Sep. 28, 2020; accessed Jul. 1, 2022; 8 pages.
"Similarity mapping parameters"; web.archive.org/web/20201029031236/https://www.elastic.co/guide/en/elasticsearch/reference/current/similarity.html; Elasticsearch; © 2020; accessed Jul. 6, 2022; 3 pages
Busa-Fekete et al.; "An apple-to-apple comparison of Learning-to-rank algorithms in terms of Normalized Discounted Cumulative Gain"; $20^{th}$ European Conf. on Artificial Intelligence: Preference Learning: Problems and Applications in AI Workshop; vol. 242; 2012; 6 pages.
Tom Fawcett; "An introduction to ROC analysis"; Pattern Recognition Letters; vol. 27; 2006; p. 861-874.
Hagberg et al.; "Exploring network structure, dynamics, and function using network"; Los Alamos National Lab; Technical Report; 2008; 6 pages.
Haveliwala et al.; "Topic-sensitive PageRank: a context-sensitive ranking algorithm for Web search"; IEEE Transactions on Knowledge and Data Engineering; vol. 15 No. 4; Jul./Aug. 2003; p. 784-796.
Liben-Nowell et al.; "The link-prediction problem for social networks"; Journal of the American Society for Information Science and Technology; vol. 58; 2007; p. 1019-1031.
Liu et al.; "Isolation Forest"; $8^{th}$ IEEE Intl Conf. of Data Mining; 2008; p. 413-422.
Menon et al.; "Link Prediction via Matrix Factorization"; Joint European Conf. on Machine Learning and Knowledge Discovery in Databases; 2011; p. 437-452.
Pedregosa et al.; "Scikit-learn: Machine Learning in Python"; Journal of Machine Learning Research; vol. 12; 2011; p. 2825-2830.
J.R. Quinlan; "Generating production rules from decision trees"; In IJCAI; vol. 87; 1987; p. 304-307.
Radlinski et al.; "Learning diverse rankings with multi-armed bandits"; Proceedings of the $25^{th}$ Int'l Conf. on Machine Learning; 2008; p. 784-791.
Rendle et al.; "BPR: Bayesian Personalized Ranking from Implicit Feedback"; arXiv:1205.2618; 2009; p. 452-461.
D. Sculley; "Large scale learning to rank"; NIPS; 2009; 6 pages.
Wang et al.; "Exploring the machine learning models behind Cloud IAM Recommender"; https://cloud.google.com/products/identity-security/exploring-the-machine-learning-models-behind-cloud-iam-recommender; Google; Nov. 2019; accessed Sep. 12, 2022; 4 pages.
U.S. Appl. No. 17/213,513, filed Mar. 26, 2021, Strong.
Hummer et al.; "Adaptive identity and access management—contextual data based policies"; EURASIP Journal on Information Security; vol. 2016:19; 2016; 16 pages.
U.S. Appl. No. 17/362,807, filed Jun. 29, 2021, Alaeddini et al.
U.S. Appl. No. 17/708,341, filed Mar 30, 2022, Alaeddini et al.
U.S. Appl. No. 17/362,807; Non-Final Office Action; dated Mar. 31, 2023; 11 pages.
Mitra et al.; "A Survey of Role Mining"; ACM Computing Surveys; vol. 48 No. 4; Feb. 2016; p. 50:1-50:37.
Kumar et al.; "Mining RBAC Roles under Cardinality Constraint"; Int'l Conf. on Information Systems Security; 2010; p. 171-185.

\* cited by examiner

Interface 140

Display 301 – Identities with Deallocation Recommendations

| Identity 311 | Recommended Deallocations Quantity 312 | Recommended Since 313 |
|---|---|---|
| IdentityTester | 24 | 10 Days Ago |
| DevelopmentalRole | 37 | 2 Months Ago |
| SecurityAuditer | 4 | 2 Months Ago |
| BillingRole | 7 | 2 Months Ago |

FIG. 3

Display 401 – Active Deallocation Recommendations for IdentityTester Role

| Permission 411 | Last Accessed 412 | Policy Granting Permissions 413 | Recommended Since 414 |
|---|---|---|---|
| ListMyBuckets (Data Storage) | 109 Days Ago | DataStoragePolicyForRoles | 10 Days Ago |
| DeleteBucket (Data Storage) | 159 Days Ago | DataStoragePolicyForRoles | 2 Months Ago |
| CreateFleet (Cloud Service) | 99 Days Ago | CloudServiceAccess | 5 Days Ago |
| ChangePassword (Identity Service) | 199 Days Ago | IdentityServiceAccess | 3 Months Ago |

415 (on each row)

Deallocate 410

Interface 140

Interface 140

Display 501 – Recommendation History for IdentityTester Role

| Permission 511 | Recommendation Type 512 | Policy Granting Permissions 513 | Recommended Since 514 |
|---|---|---|---|
| ListMyBuckets (Data Storage) | Deallocate | DataStoragePolicyForRoles | 10 Days Ago |
| ListMyBuckets (Data Storage) | Retain | DataStoragePolicyForRoles | 2 Months Ago |
| CreateFleet (Cloud Service) | Deallocate | CloudServiceAccess | 2 Months Ago |
| CreateFleet (Cloud Service) | Retain | CloudServiceAccess | 4 Months Ago |

FORECAST-BASED PERMISSIONS RECOMMENDATIONS

CROSS-REFERENCE TO RELATED APPLICATIONS

This application is related to the following application: U.S. patent application No. 17/104,984 filed Nov. 25, 2020, entitled "CONTEXTUAL POLICY WEIGHTING FOR PERMISSIONS SEARCHING".

BACKGROUND

Access to computing services and resources may be managed through an identity management service, which may allow customers to create identities (e.g., users, groups, roles, etc.) and allocate permissions to the identities. In some examples, permissions for an identity may be defined by attaching a policy to the identity, and the policy may define permissions that are allocated to the identity. The principle of least-privilege is a cornerstone of security that specifies that each identity should only have permission to access the services that it needs to perform its specific tasks. Restricted permissions limit the potential impact of a compromised identity. In practice, however, configuring permissions correctly is time-consuming and error-prone. It is rare to know exactly which permissions are necessary in advance. Thus, customers may often allocate more permissions than necessary to an identity. For example, administrators often grant broad permissions to help teams move fast when they get started. As teams and applications mature, their workloads only need a subset of permissions. However, customers may often fear removing permissions due to the risk of an operational impact caused by denying necessary access. Furthermore, customers may have difficulty determining when an existing allocated permission is not needed.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is a diagram illustrating a first example interface display for showing identities with deallocation recommendations that may be used in accordance with the present disclosure.

FIG. 4 is a diagram illustrating a second example interface display for showing active deallocation recommendations for an identity that may be used in accordance with the present disclosure.

FIG. 5 is a diagram illustrating a third example interface display for showing a deallocation recommendations history for an identity that may be used in accordance with the present disclosure.

DETAILED DESCRIPTION

Figure 1:
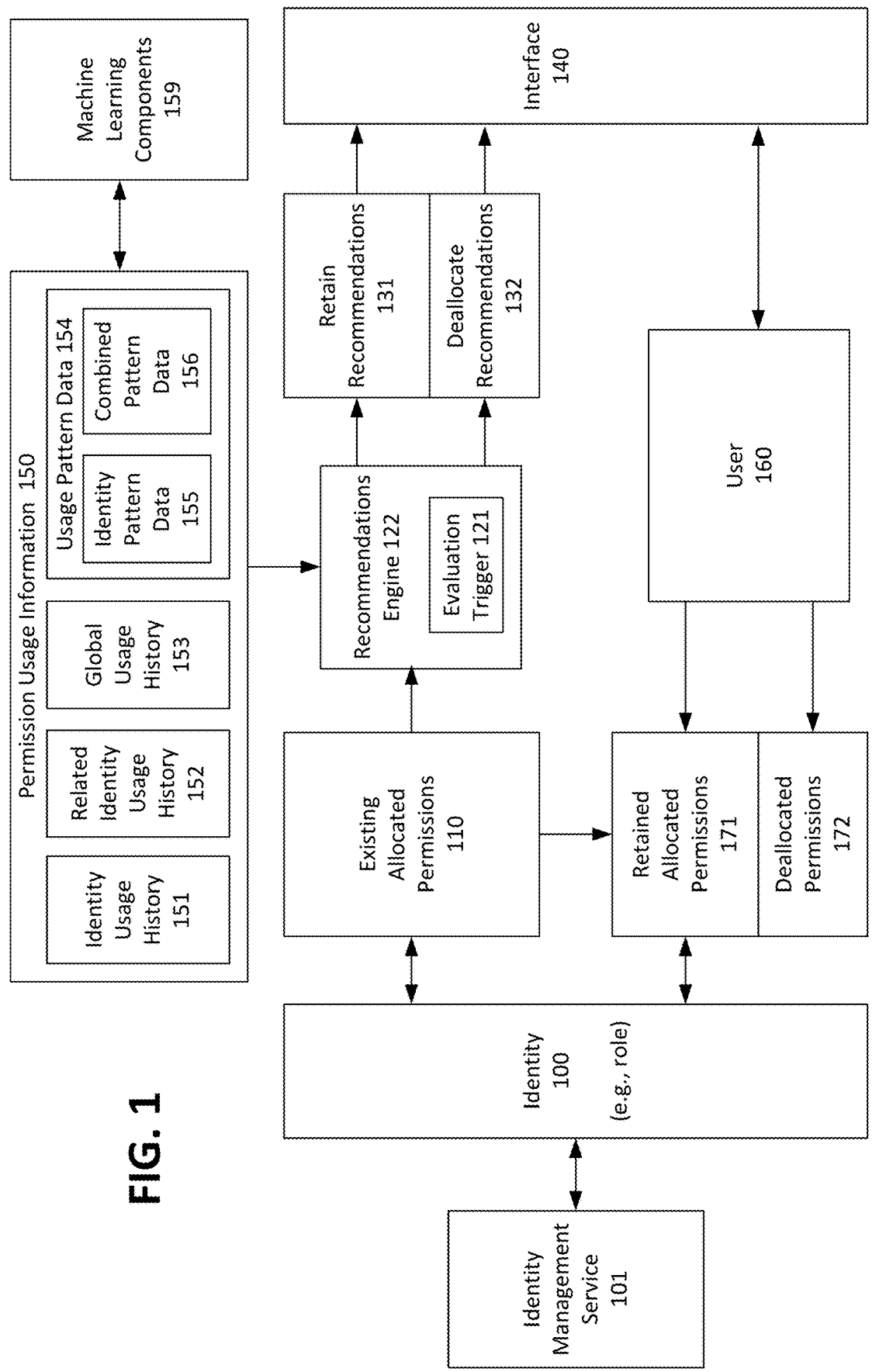
FIG. 1 is a diagram illustrating an example forecast-based permissions recommendation system that may be used in accordance with the present disclosure.

Techniques for forecast-based permissions recommendations are described herein. In some examples, a recommendations engine may periodically analyze an identity's allocated permissions and usage histories of those permissions. Based at least in part on the usage histories, the recommendations engine may make recommendations to a customer regarding which of the permissions should be retained and which of the permissions should be deallocated from the identity. The customer may then use these recommendations to potentially modify the identity's permissions, such as by deallocating one or more of the permissions that are recommended for deallocation. In order to make these recommendations, the recommendations engine may determine an extent to which an identity is likely to use a permission in the future. Generally, permissions that are determined to be more likely to be used in the future, such as above a selected probability threshold, may be recommended to be retained. By contrast, permissions that are determined to be less likely to be used in the future, such as below a selected probability threshold, may be recommended for deallocation.

In some conventional techniques, permissions may be kept or removed based on a determination of whether they have been used within a selected prior time window, such as within a previous 90 day time window. For example, permissions that have been used at least once within the previous 90 days may be retained. By contrast, permissions that have not been used within the previous 90 days may be removed. However, one problem with this technique is that it may result in removal of permissions that an identity is likely to use in the future. For example, consider a scenario in which an identity needs to use a given permission every 180 days, such as for the purposes of preparing reports. Now also consider the scenario in which the usage history for the identity indicates that the last time that the identity used this permission was 120 days ago. In this example, because the last usage date (120 days ago) is outside of the 90 day time window, a strict time-window based analysis would result in removal of the permission. However, because the identity needs to use the permission every 180 days, the identity will need to use this permission again in 60 days. Thus, even though the identity has not used the permission within the previous 90 day time window, removal of the permission is nevertheless not desirable.

In order to alleviate these and other problems, the techniques described herein may employ forecast-based permissions recommendations. Specifically, this may include analyzing permission usage information to determine an estimated probability that a permission will be used again in the future. In some examples, the estimated probability may be a percentage, a range of percentages, a relative weight (e.g., high, medium, low, etc.), or any other type of probability. In some cases, the estimated probabilities may be non-binary, meaning that permissions may be assigned more than only two possible probabilities (e.g., that permissions may be assigned probabilities other than only high probability or low probability). In some examples, permissions that have an estimated probability of future use that is greater than a threshold probability may be recommended to be retained. By contrast, permissions that have an estimated probability of future use that is less than a threshold probability may be recommended for deallocation.

The permission usage information that is analyzed to determine the estimated probabilities may include, for example, permissions usage history for the identity, permissions usage history for related identities (e.g., identities within the same customer account, global permissions usage history (e.g., for all identities in an identity management service), usage pattern data, and other recommendations information. In some examples, usage histories of related identities may assist in determining to retain a permission, even when the permission has not been used by a given identity. This is because related identities may often eventually use similar permissions. As a specific example, if an employee is frequently using a permission, then there may be a high likelihood that the employee's supervisor will eventually also use this same permission. Thus, in some examples, even when an identity has not used a permission, a recommendations engine may still recommend retaining of the permission if other related identities are frequently using the permission.

In some examples, the usage pattern data may be determined based at least in part on a machine learning analysis of the identity usage history, related identity usage history, and/or global usage history. The usage pattern data may include for example, patterns of repeat permission usage by an identity. For example, an identity's usage history may be analyzed to determine patterns associated with usage of a permission by the identity. As a specific example, if an identity uses a given permission every 180 days, then this may be determined and included in the identity usage pattern data. In some examples, even if an identity has not recently used a given permission (e.g., not within the previous 90 days), a recommendations engine may nevertheless estimate that the probability of future usage of the permission is high. For example, if the permission was previously used every 180 days, and it has been less than 180 days since the permission was last used, then the recommendations engine may determine that there is a high probability that the permission will be used again in the future (e.g., at the next 180 day interval). By contrast, if the permission was previously used every 180 days, but it has been more than 180 days since the permission was last used, then the recommendations engine may determine that there is a lower probability that the permission will be used again in the future (e.g., because the 180 day interval has expired).

The usage pattern data may also include patterns of permissions that are commonly used together. For example, machine learning components may analyze the global usage history to determine that Permission Y is frequently used in combination with Permission X. This may be helpful in determining when an identity is likely to, in the future, use a permission that the identity has not recently used (or may have never previously used). For example, consider a scenario in which an identity has frequently used Permission X but has not yet used Permission Y. In this example, even though the identity has not used Permission Y, a recommendations engine may look at the usage pattern data to determine that Permission Y is frequently used in combination with Permission X. Based on this information, the recommendations engine may estimate that there is a high probability that the identity will use Permission Y in the future, even though the identity has not yet done so.

In some examples, the permissions recommendations, such as to retain and/or deallocate one or more permissions, may be presented to a user via an interface. For example, in some cases, an interface may provide a display that includes a list of all identities for which one or more active permissions recommendations are made. In some cases, the display may indicate, for each identity, information such as a quantity of recommendations, a recommendation type (e.g., retain or deallocate), a time since one or more of the recommendations were initially made, and other information. Additionally, in some examples, a permission recommendation history display may be provided. In some cases, this display may indicate, for each permission, information such as a recommendation type (e.g., retain or deallocate), a policy granting the permission, a time since the recommendation was initially made, and other information.

An interface may also allow a user to select a given identity, and the interface may provide a display of each permission that is actively recommended for deallocation for the identity. In some cases, the display may indicate, for each permission that is actively recommended for deallocation, information such as a time at which the permission was last used, a region in which the permission was last used, a policy granting the permission, a time since the recommendation was initially made, and other information. This information may provide the user with a confirmation that the deallocation recommendation is valid and may also assist the user in determining whether, or not, to follow the recommendation and deallocate the permission. In some cases, the display may allow the user to select one or more of the permissions for deallocation and to deallocate the selected permissions. In some examples, a permission may be deallocated by modifying an existing policy that is attached to the identity and that includes the permission, such as to remove the permission from the policy. In other examples, a permission may be deallocated by detaching, from the identity, an existing policy that includes the permission. The detached policy may then optionally be replaced with a different policy that does not include the deallocated permission (but that does include other desired permissions).

In some examples, the permissions recommendations described herein may be made for deallocating permissions from an identity, for example as opposed to deleting and replacing the identity itself. For example, even when a permission is deallocated from an identity, the identity may remain active and persist with the retained permissions. This may be advantageous, for example, because it may allow permissions to be deallocated without causing the identity itself to be replaced/deleted. This may, for example, allow the existing identity to continue to interact with applications and resources for which the identity retains permissions, without requiring the customer to update/reconfigure those applications and resources.

FIG. 1 is a diagram illustrating an example forecast-based permissions recommendation system that may be used in accordance with the present disclosure. As shown in FIG. 1, identity 100, such as a user, group, role, etc, may be managed using an identity management service 101. Identity management service 101 may allow a customer to create identity 100 and to allocate the existing allocated permissions 110 to the identity 100. In some examples, the existing allocated permissions 110 may be allocated to identity 100 by attaching one or more policies to identity 100. In some examples, a permission may include a service and/or resource and one or more actions that are permitted to be performed on the service and/or resource. Customers may often allocate more permissions than necessary to an identity. For example, administrators often grant broad permissions to help teams move fast when they get started. As teams and applications mature, their workloads only need a subset of permissions.

In the example of FIG. 1, a recommendations engine 122, such as may be provided by identity management service 101, may analyze the existing allocated permissions 110 to make retain recommendations 131 and deallocate recommendations 132. The deallocate recommendations 132 are recommendations to deallocate one or more of the existing allocated permissions from identity 100. By contrast, the retain recommendations 131 are recommendations to retain (i.e., not to deallocate from identity 100) one or more other of the existing allocated permissions 110. As described in greater detail, both the retain recommendations 131 and the deallocate recommendations 132 may be provided to a user 160, for example via an interface 140, which may also be provided by the identity management service 101.

In the example of FIG. 1, upon viewing the retain recommendations 131 and/or the deallocate recommendations 132, the user 160 chooses to deallocate, from identity 100, the permissions identified by the deallocate recommendations 132. Specifically, the user 160 may employ interface 140 to deallocate the deallocated permissions 172 from identity 100. The deallocated permissions 172 are the permissions identified by the deallocate recommendations 132. After being deallocated from the identity 100, the deallocated permissions 172 are no longer available to the identity 100 (unless and until they are optionally reallocated at a subsequent time). By contrast, the retained allocated permissions 171 are not deallocated from the identity 100. The retained allocated permissions 171 therefore remain allocated to the identity 100. In some examples, no user action is required to retain a permission in the retained allocated permissions 171. Rather, a permission may remain allocated to identity 100 unless the permission is deallocated by the user 160.

As shown in FIG. 1, the recommendations engine 122 may employ forecast-based techniques in order to perform permissions recommendations. Specifically, this may include analyzing permission usage information 150 to determine an estimated probability that a permission will be used again in the future. In some examples, the estimated probability may be a percentage, a range of percentages, a relative weight (e.g., high, medium, low, etc.), or any other type of probability. In some cases, the estimated probabilities may be non-binary, meaning that permissions may be assigned more than only two possible probabilities (e.g., that permissions may be assigned probabilities other than only high probability or low probability). In some examples, permissions that have an estimated probability of future use that is greater than a threshold probability may be recommended to be retained. By contrast, permissions that have an estimated probability of future use that is less than a threshold probability may be recommended for deallocation. The term forecast, as used herein, refers to a determination of an estimated probability of a future use. There is no requirement that a forecasted use must actually occur.

In the example of FIG. 1, the permission usage information 150 includes identity usage history 151, related identity usage history 152, global usage history 153, and usage pattern data 154. The identity usage history 151 may be a permissions usage history for identity 100. The related identity usage history 152 may be a permissions usage history for one or more identities that are related to identity 100, such as other identities within the same customer account as identity 100. Global usage history 153 may be a permission usage history for a broader range of identities, such as all identities that are managed by the identity management service 101. Data stored in the global usage history 153 (or other usage histories and/or usage patterns) may optionally be anonymized, for example such as not to reveal usage histories for given customers. It is noted that the identity usage history 151 and/or the related identity usage history 152 may be included in the global usage history 153. These usage histories are nevertheless displayed as separate elements in FIG. 1 because they may, in some examples, be separately aggregated and analyzed for recommendations purposes.

In some examples, the identity usage history 151 may provide a strong indication to retain or deallocate a permission. For example, if the identity usage history 151 indicates that a given permission has been both recently and frequently used by the identity 100, then this may be a strong indication to recommend retaining of the permission. Also, in some examples, the related usage history 152 may assist in determining to retain a permission, even when the permission has not been used by the identity 100. This is because related identities may often eventually use similar permissions. As a specific example, if an employee is frequently using a permission, then there may be a high likelihood that the employee's supervisor will eventually also use this same permission. Thus, in some examples, even when identity 100 has not used a permission, the recommendations engine 122 may still recommend retaining of the permission if other related identities are frequently using the permission.

In the example of FIG. 1, the usage pattern data 154 includes identity pattern data 155 and combined pattern data 156. In some examples, the usage pattern data 154 may be determined based at least in part on a machine learning analysis of the identity usage history 151, the related identity usage history 152, and/or the global usage history 153. This machine learning analysis may be performed by machine learning components 159. The identity pattern data 155 may include for example, patterns of repeat permission usage by identity 100. For example, the identity usage history 151 may be analyzed to determine patterns associated with usage of a permission by the identity 100. As a specific example, if identity 100 uses a given permission every 180 days, then this may be determined and included in the identity pattern data 155. In some examples, even if identity 100 has not recently used a given permission (e.g., not within the previous 90 days), a recommendations engine may nevertheless estimate that the probability of future usage of the permission is high.

Figure 2:
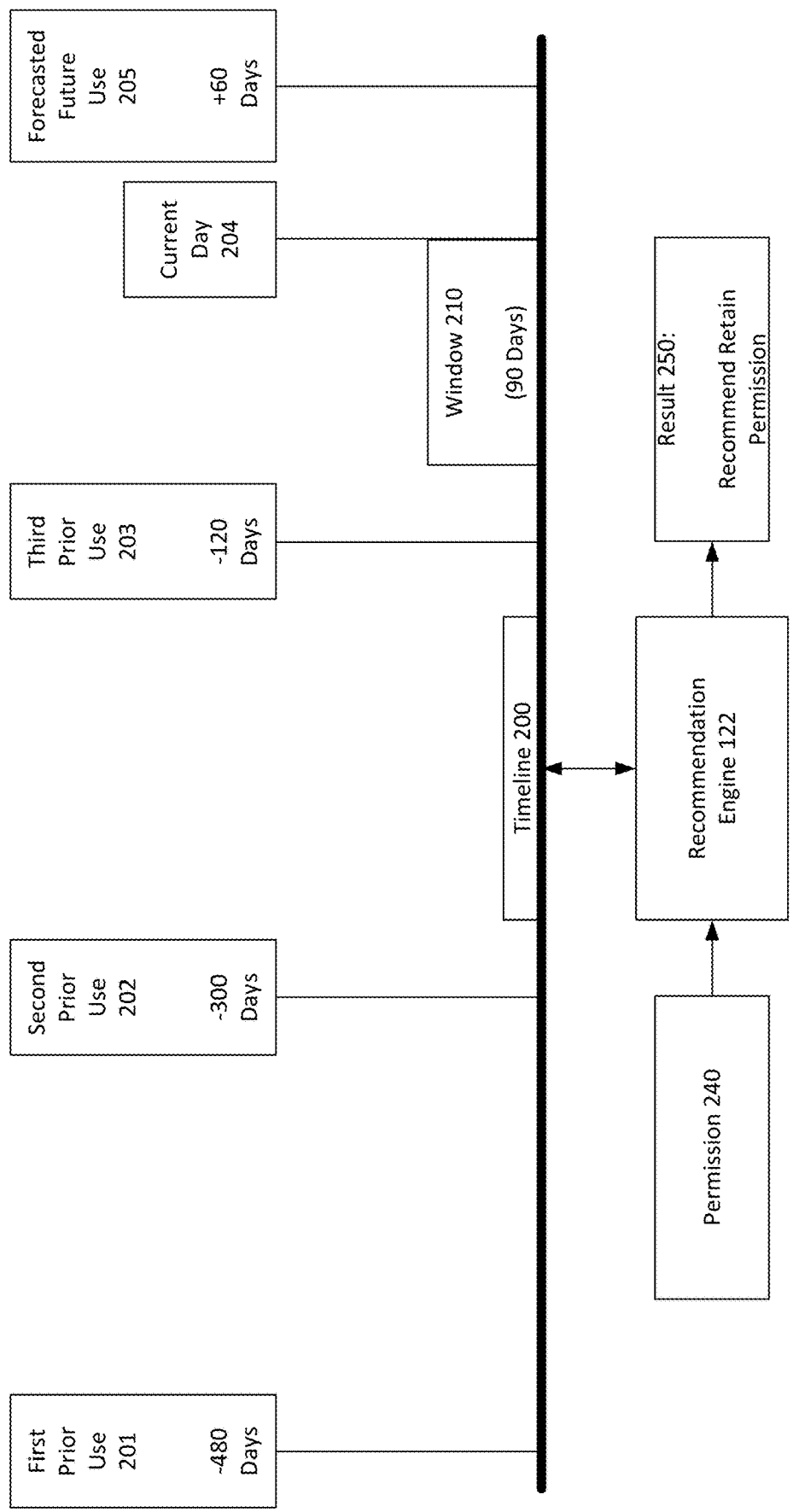
FIG. 2 is a diagram illustrating an example identity usage pattern that may be used in accordance with the present disclosure.

Referring now to FIG. 2, an example identity usage pattern will now be described in detail. In the example of FIG. 2, a timeline 200 is used to represent usage of a permission 240 by identity 100, for example based on identity usage history 151. Specifically, in this example, the identity usage history 151 indicates that a first prior use 201 of permission 240, by identity 100, occurred 480 days prior to a current day 204. Additionally, the identity usage history 151 indicates that a second prior use 202 of the permission 240, by identity 100, occurred 300 days prior to the current day 204. Furthermore, the identity usage history 151 indicates that a third prior use 203 of the permission 240, by identity 100, occurred 120 days prior to the current day 204. In this example, the gap between first prior use 201 and second prior use 202 is 180 days (i.e., the difference between 480 days and 300 days). Additionally, the gap between second prior use 202 and third prior use 203 is also 180 days (i.e., the difference between 300 days and 120 days). Based on this information, it may be determined that the identity 100 has used the permission 240 every 180 days. This usage pattern may be indicated in identity pattern data 155.

In the example of FIG. 1, window 210 is a sliding prior time window that the recommendations engine may determine to assist in the recommendations process. In this example, the window 210 has a duration of 90 days. It is appreciated, however, that other time durations may be used. In some examples, when a permission has been used within the window 210, then this may be an indication that the permission should be retained. In this example, however, the most recent prior usage of the permission 240 was third prior use 203, which was 120 days ago. Thus, the permission 240 has not been used at all within window 210. As will now be described in detail, although the permission 240 has not been used within window 210, the techniques described herein may be employed to determine that the permission 240 is nevertheless likely to be used again by identity 100 in the future. Specifically, in this case, by determining a usage pattern that indicates that the permission 240 has been used every 180 days, the techniques described herein may be employed to forecast that the permission 240 is likely to be used again at the next 180 day interval. In this example, the next 180 day interval falls 60 days in the future from the current date. Based on this usage pattern, a forecasted future use 205 of permission 240 is forecasted to occur 60 days from the current day 204. In this example, based on the forecasted future use 205, the recommendations engine 122 may determine to recommend retaining of the permission 240, as indicated by result 250.

Referring back to FIG. 1, it is seen that the usage pattern data 154 may also include combined pattern data 156, which may indicate patterns of permissions that are commonly used together. In some examples, combined pattern data 156 may be generated based on an analysis of global usage history 153 by machine learning components 159. As a specific example, machine learning components 159 may analyze global usage history 153 to determine that Permission Y is frequently used in combination with Permission X. This may be helpful in determining when an identity is likely to, in the future, use a permission that the identity has not recently used (or may have never used). For example, consider a scenario in which identity 100 has frequently used Permission X but has not yet used Permission Y. In this example, even though the identity 100 has not used Permission Y, the recommendations engine 122 may look at the combined pattern data 156 to determine that Permission Y is frequently used in combination with Permission X. Based on this information, the recommendations engine 122 may estimate that there is a high probability that the identity 100 will use Permission Y in the future, even though the identity 100 has not yet done so. In view of this, the recommendations engine 122 may recommend retaining of permission Y.

Referring back to FIG. 1, the permissions recommendations, such as retain recommendations 131 and/or deallocate recommendations 132, may be presented to user 160 via interface 140. Some examples of interface 140 will now be described in detail. Referring now to FIG. 3, an example is shown of a display 301 of a customer's identities with active deallocation recommendations. Active deallocations recommendations may include deallocation recommendations that have been made and that have not yet been accepted by the user (e.g., by deallocating those permissions from the identity) or removed (e.g., based on a reevaluation of the permissions). For example, a deallocation recommendation might be removed if an identity uses the permission several times after the deallocation recommendation is made. As shown, display 301, which is included in interface 140, includes an identity column 311, a recommended deallocations quantity column 312, and a recommended since column 313. The identity column 311 lists all of the customer's identities with active deallocation recommendations In some examples, additional identities (and their respective information) may be shown in display 301 by scrolling up or down. The recommended deallocations quantity column 312 indicates a quantity of active deallocation recommendations for each identity listed in identity column 311. The recommended since column 313 indicates an amount of time since the recommendations were made, such as an amount of time since an oldest active deallocate recommendation was made for an identity, an amount of time since a most recent active deallocate recommendation was made for an identity, or an average amount of time since all of the active deallocate recommendations were made for an identity.

In some examples, a user may select one of the identities listed in identity column 311, such as to view more detailed recommendations information. For example, in some cases, a user may select one of the identities in identity column 311, such as by clicking on the identity's name (and/or its corresponding row in display 301) using a mouse, touchscreen, etc. Referring now to FIG. 4, an example is shown of a display 401 of active deallocate recommendations for a selected identity (i.e., the IdentityTester role). For example, in some cases, display 401 may be presented in response to a user selecting the IdentityTester role from via display 301, such as by clicking on the IdentityTester name in identity column 311. As shown in FIG. 4, display 401 includes a permission column 411, a last accessed column 412, a policy granting permissions column 413, and a recommended since column 414. The permission column 411 lists each permission of the IdentityTester role for which an active deallocation recommendation has been made. In some examples, additional permissions (and their respective information) may be shown in display 401 by scrolling up or down. The last accessed column 412 indicates an amount of time that has expired since a most recent time that each permission listed in permissions column 411 was used by the IdentityTester role. This information may provide the user with a confirmation that the deallocation recommendation is valid and may also assist the user in determining whether, or not, to follow the recommendation and deallocate the permission. In some examples, in addition, or as alternative to, a last accessed time, other last access information may be displayed, such as a region in which the permission was last accessed/used by the IdentityTester role. The policy granting permissions column 413 indicates a policy that grants each permission listed in permission column 411. The recommended since column 414 indicates an amount of time since each respective deallocate recommendation was initially made.

In the example of FIG. 4, the display 401 includes checkboxes 415 that allow the user to select one or more of the permissions listed in permissions column 411, such as by clicking on the checkboxes 415 using a mouse, touchscreen, etc. Additionally, in the example of FIG. 4, the user may select deallocate button 410, for example to trigger an initiation of a deallocation process for each selected permission. In some examples, a permission may be deallocated by modifying an existing policy that is attached to the identity and that includes the permission, such as to remove the permission from the policy. In other examples, a permission may be deallocated by detaching, from the identity, an existing policy that includes the permission. The detached policy may then optionally be replaced with a different policy that does not include the deallocated permission (but that does include other desired permissions). In some examples, the permissions recommendations described herein may be made for deallocating permissions from an identity, for example as opposed to deleting and replacing the identity itself. For example, even when a permission is deallocated from the IdentityTester role, the IdentityTester role may remain active and persist with the retained permissions. This may be advantageous, for example, because it may allow permissions to be deallocated without causing the IdentityTester role itself to be deleted and/or replaced. This may, for example, allow the IdentityTester role to continue to interact with applications and resources for which the IdentityTester role retains permissions, without requiring the customer to update/reconfigure those applications and resources.

In some examples, in addition to active recommendations, interface 140 may also provide a recommendations history, for example showing both active recommendations and previous recommendations that are no longer active. Referring now to FIG. 5, an example is shown of a display 501 of a recommendation history for a selected identity (i.e., the IdentityTester role). As shown in FIG. 4, display 501 includes a permission column 511, a recommendation type column 512, a policy granting permissions column 513, and a recommended since column 514. The permission column 511 lists each permission of the IdentityTester role for which a recommendation has been made (whether still active or no longer active). The recommendation type column 512 indicates a recommendation type (e.g., retain or deallocate) for each listed recommendation. The policy granting permissions column 513 indicates a policy that grants each permission listed in permission column 411. The recommended since column 414 indicates an amount of time since each respective recommendation was initially made. For example, the display 501 includes two rows corresponding to the ListMyBuckets (Data Storage) permission. The lower of these two rows indicates that, two months ago, a recommendation was to retain the ListMyBuckets (Data Storage) permission. However, the next row up indicates that, ten days ago, the retain recommendation for ListMyBuckets (Data Storage) permission was changed to a deallocate recommendation. For example, ten days ago, the recommendations engine may have reevaluated the permissions for the IdentityTester role and determined that the ListMyBuckets (Data Storage) permission was no longer likely to be used in the future by the IdentityTester role, thereby causing the recommendations engine to change the recommendation for the ListMyBuckets (Data Storage) permission from retain to deallocate. It is noted that any, or all, of displays 301, 401, and 501 may be displayed via a user interface, such as a graphical user interface (GUI) of a computer, for example via a computer display screen or monitor.

In some examples, permissions recommendations may be reevaluated at fixed repeating intervals, such as every week, every ten days, etc. In other examples, permissions recommendations may be reevaluated in response to an event, such as a change in usage behavior by the identity. This change in usage behavior may include, for example, accessing of a new service and/or resource for the first time, failure to re-access a service and/or resource at an expected time, and/or other changes in behavior. In some examples, an identity's usage may be monitored to determine when an event occurs that may trigger reevaluation of recommendations. For example, when a user accesses a new service and/or resource for the first time, this may trigger permissions recommendations to be reevaluated, such as because it could cause a deallocation recommendation associated with permissions for the service and/or resource to be changed to a retain recommendation. As yet another example, a failure to re-access a service and/or resource at an expected time may also cause permissions recommendations to be reevaluated. For example, referring back to FIG. 2, if the identity 100 failed to use permission 240 on the day of the forecasted future use 205, then this may cause the recommendation for permission 240 to be changed from a retain recommendation to a deallocate recommendation. In some examples, on the current day 204, identity management service 101 may schedule a task to review usage of permission 240 on the day of the forecasted future use 205 (or on a date determined based on the forecasted future use 205) to determine whether permission 240 is used as predicted. Referring back to FIG. 1, it is shown that the recommendations engine 122 includes an evaluation trigger 121, which causes the recommendations engine to evaluate (or reevaluate) the permissions for identity 100. The evaluation trigger 121 may be a change in behavior, a fixed reevaluation interval (e.g., every week, every ten days, etc.), or any other trigger that causes evaluation (or reevaluation) of the permissions for identity 100.

Figure 6:
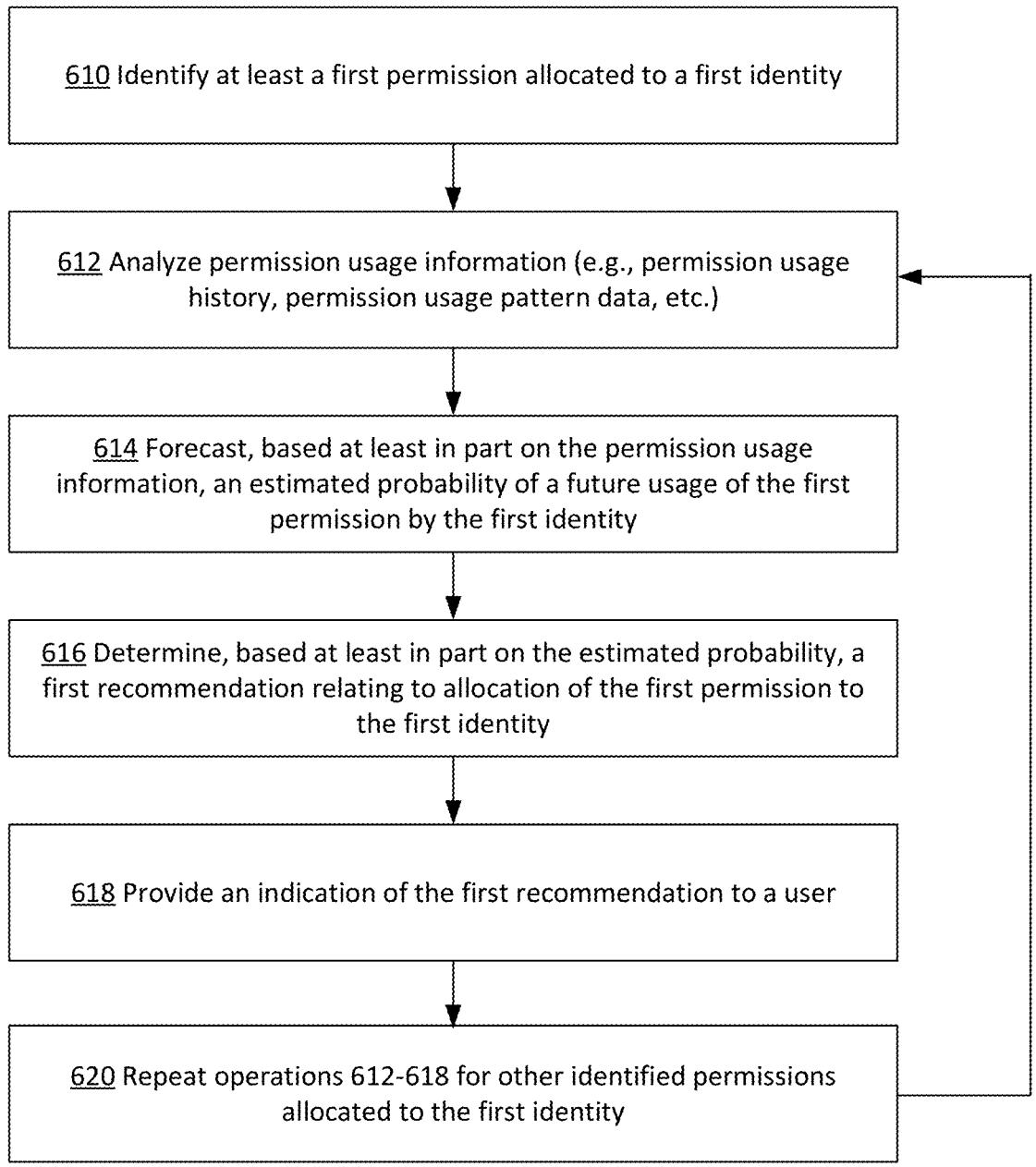
FIG. 6 is a flowchart illustrating an example forecast-based permissions recommendation process that may be used in accordance with the present disclosure.

FIG. 6 is a flowchart illustrating an example forecast-based permissions recommendation process that may be used in accordance with the present disclosure. The process of FIG. 6 is initiated at operation 610, at which at least a first permission allocated to a first identity is identified. The first identity may be managed by an identity management service. As shown in FIG. 1, existing allocated permissions 110, for example including the first permission, may be allocated to an identity 100. In some examples, an identity management service may maintain one or more stored records that indicate which permissions are allocated to the first identity. Additionally, in some examples, the first permission (and other permissions allocated to the first identity) may be identified by analyzing these one or more stored records.

At operation 612, permission usage information is analyzed. As described above, the permission usage information may include, for example, a permission usage history of the first identity (e.g., identity usage history 151), a permission usage history of one or more other identities that are related to the first identity (e.g., related identity usage history 152), and a global permission usage history, such as for all identities managed by the identity management service (e.g., global usage history 153). The permission usage information may also include, for example, permission usage pattern data (e.g., usage pattern data 154). The permission usage pattern data may include, for example, identity pattern data and combined pattern data. The identity pattern data may include for example, patterns of repeat permission usage by the first identity. The combined pattern data may indicate patterns of permissions that are commonly used together. In some examples, the permission usage pattern data may be determined based at least in part on a machine learning analysis of usage histories of a plurality of identities. For example, in some cases, the combined pattern data may be determined based at least in part on a machine learning analysis of the global permission usage history. In some examples, the permission usage data may be analyzed by any combination of the recommendations engine 122, the machine learning components 159, and/or other components. As described in detail above, in some examples, the permission usage information may be analyzed to determine information regarding prior usages of the first permission by the first identity, prior usages of the first permission by related identities, usage patterns relating to the first permission (e.g., repeat usage of the first permission, frequent usage of the first permission in combination with other permissions, etc.) by the first identity, related identities and/or on a global scale, and many other types information.

At operation 614, an estimated probability of a future usage of the first permission by the first identity is forecasted based, at least in part, on the permission usage information. In one specific example, the identity usage history 151 may be looked at first, such as to determine whether the first identity has recently used the first permission. For example, in some cases, it may be determined if the first identity has used the first permission within a sliding time window extending back from the current time/day, such as within a most recent 90 days. In some examples, if the first identity has used the first permission within this sliding time window, then there may be a high estimated probability of future use. Additionally, if the first permission has been used more than once (or several times) within this sliding time window, then this may cause the estimated probability to be higher than if the first permission was used only once (or only a small number of times). By contrast, if the first permission has not been used within the sliding time window, then the recommendations engine may examine other factors. For example, the recommendations engine may examine the related identity usage history 152 to determine whether the first permission has been used by other identities that are related to the first identity (e.g., identities within the same customer account). If the first permission has been used by one or more other related identities within the sliding time window, then this may also cause the estimated probability to be high. Additionally, in some examples, the recommendations engine may examine the identity pattern data to determine whether the first identity has established a pattern of usage of the first permission at repeat intervals (e.g., as shown in FIG. 2). In some examples, if the first identity has established such a repeat pattern of use, then this may also cause the estimated probability to be high. In some cases, the estimated probability may be higher when the first identity has established this pattern and followed it consistently, while the estimated probability may be less high when the usage pattern has been interrupted or stopped altogether. Furthermore, in some examples, the recommendations engine may examine the identity usage history to determine other permissions that have been recently used by the first identity. The recommendations engine may then examine the combined pattern data to determine whether any of these other recently used permissions are frequently used in combination with the first permission. In some examples, if one or more of these other recently used permissions are frequently used in combination with the first permission, then this may also cause the estimated probability to be high. By contrast, in some examples, if the first permission has not been recently used by the first identity, and if the usage pattern data fails to indicate that the first permission is likely to be used in the future, then the estimated probability of future use may be determined to be low. In some examples, the estimated probability may be expressed using at least one of a percentage or a ratio. It is noted, however, that the estimated probability may also be expressed in other ways, such as using a relative weight (e.g., high, medium, low, etc.) or other techniques.

At operation 616, a first recommendation relating to allocation of the first permission to the first identity is determined, based at least in part on, the estimated probability. In some examples, the first recommendation may be a recommendation for the first identity to retain the first permission or a recommendation to deallocate the first permission from the first identity. For example, in some cases, the recommendations engine may compare the estimated probability to a threshold probability, such as a threshold probability selected by the identity management service and/or by a customer. In some examples, it may be determined that the estimated probability is less than the threshold probability. It may then be determined to recommend deallocation of the first permission based, at least in part on, the estimated probability being less than the threshold probability. In some other examples, it may be determined that the estimated probability is greater the threshold probability. It may then be determined to recommend retaining of the first permission based, at least in part, on the estimated probability being greater than the threshold probability. In some examples, the threshold probability may be expressed using at least one of a percentage or a ratio. It is noted, however, that the threshold probability may be expressed in other ways, such as using other using weights or other techniques. In one specific example, a pattern of repeat usage of the first permission by the first identity may be determined (e.g., every 180 days, as shown in FIG. 2). It may then be determined, based at least in part on the pattern of repeat usage, to recommend retaining of the first permission by the first identity (e.g., as shown in result 250 of FIG. 2). In another specific example, it may be determined that a second identity, which is related to the first identity, has used the first permission. It may then be determined, based at least in part on usage of the first permission by the second identity, to recommend retaining of the first permission by the first identity.

At operation 618, an indication of the first recommendation is provided to a user. For example, in some cases, the indication of the first recommendation may be provided via an interface of the identity management service. As a specific example, FIG. 4 shows a display 401 that presents active deallocation recommendations for a selected identity (i.e., the Identity Tester role). As another example, FIG. 5 shows a display 401 that presents a recommendations history for the Identity Tester role, including a history of deallocation recommendations and retain recommendations. An interface may also display last access information associated with a last access of the first permission by the first identity.

At operation 620, a repetition is performed of prior operations 612-618 for one or more other identified permissions allocated to the first identity. For example, for a second permission, the permission usage information may optionally be re-analyzed in relation to the second permission, an estimated probability of a future usage of the second permission by the first identity may be forecasted based, at least in part, on the permission usage information. A second recommendation (e.g., to retain or deallocate the second permission) may then be determined, based at least in part on, the estimated probability. An indication of the second recommendation may then be provided to the user.

In some examples, after making recommendations for the permissions that are allocated to the first identity, the identity management service may review the recommendations to determine whether a collective recommendation should be made for the identity as whole. For example, in some cases, if the service has recommended that all (or a large percentage) of the permissions should be deallocated, then this may indicate that the first identity may no longer be necessary. Thus, in some examples, such as when an amount (e.g., quantity, percentage, etc.) of deallocation recommendations for an identity exceeds a selected threshold, the service may make an additional recommendation that the identity itself should be deleted (or that the customer should at least consider whether the identity is still useful and/or necessary). For example, in some cases, this may occur when the quantity of deallocation recommendations for the identity exceeds a threshold quantity and/or when the percentage of threshold recommendations (e.g., as compared to the total quantity of permissions allocated to the identity as a whole) exceeds a threshold percentage.

As described above, the evaluation of the permissions recommendations may be performed based on a trigger, such as a change in behavior of the first identity. For example, a change in usage behavior by the first identity may be detected. It may then be determined, based at least in part on the change in the usage behavior, to evaluate (including an initial evaluation and/or a reevaluation) permissions recommendations for the first identity. In some examples, the change in behavior may include accessing, by the first identity, of a service that the first identity has not previously accessed. In other examples, the change in behavior may include failing to use a permission at a repeating time interval.

In some examples, permissions may be analyzed in association with various access constructs, such as in relation to public access. For example, in some cases, usage of computing services, resources, and the like may be monitored to determine permissions recommendations. As a specific example, suppose that a given computing resource is currently publicly accessible. Now suppose that an analysis of the resource's usage indicates that it is only being used by a single account. In this example, because the resource is only being used by a single account, it may be determined that public access to the resource is unnecessary. In this scenario, a recommendation may be made to remove public access to the resource, and limit access to resource to the single account that is actually using the resource.

Figure 7:
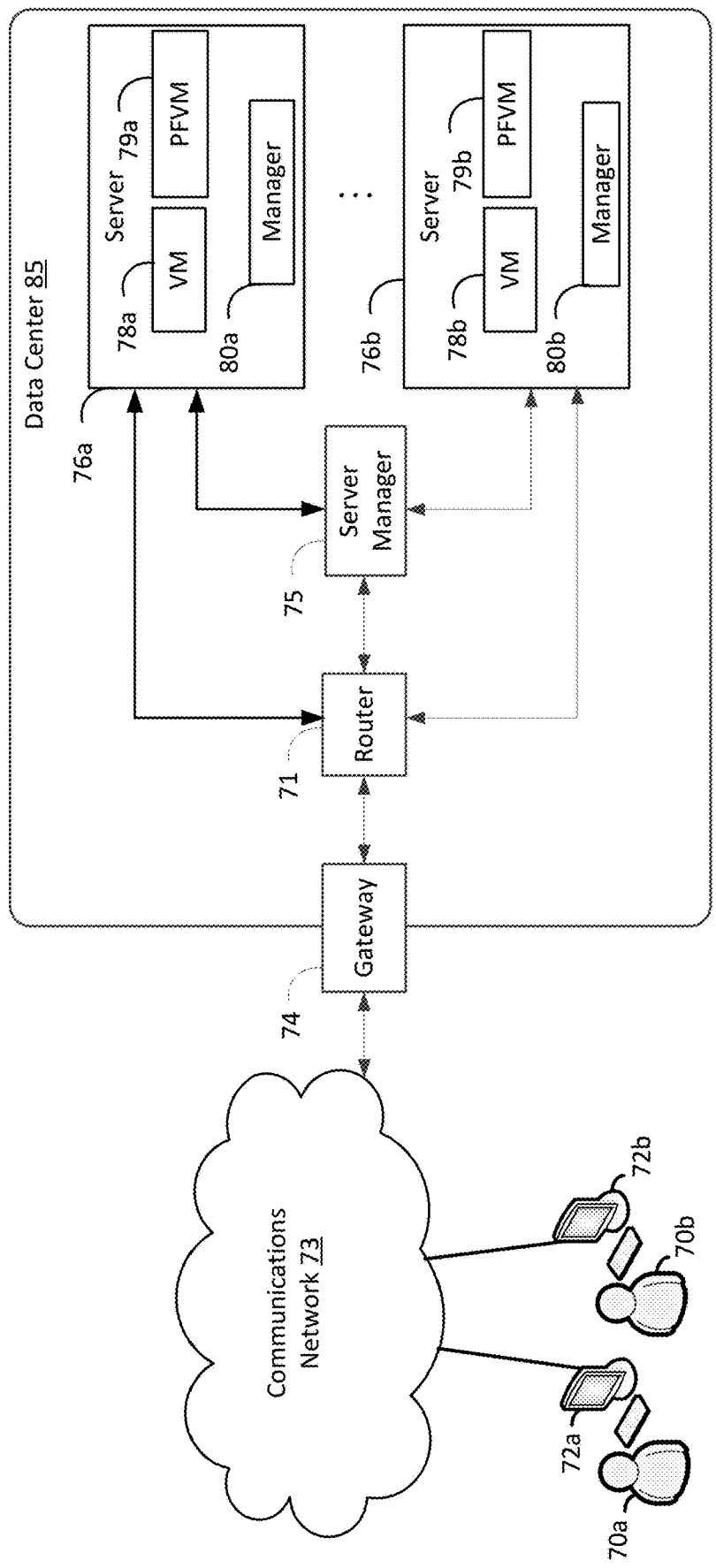
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include permissions forecasting virtual machines (PFVM's) 79*a-b*, which are virtual machines that are configured to execute any, or all, of the permissions forecasting techniques described herein, such as to assist in providing permissions recommendations (e.g., to retain or deallocate permissions) as described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
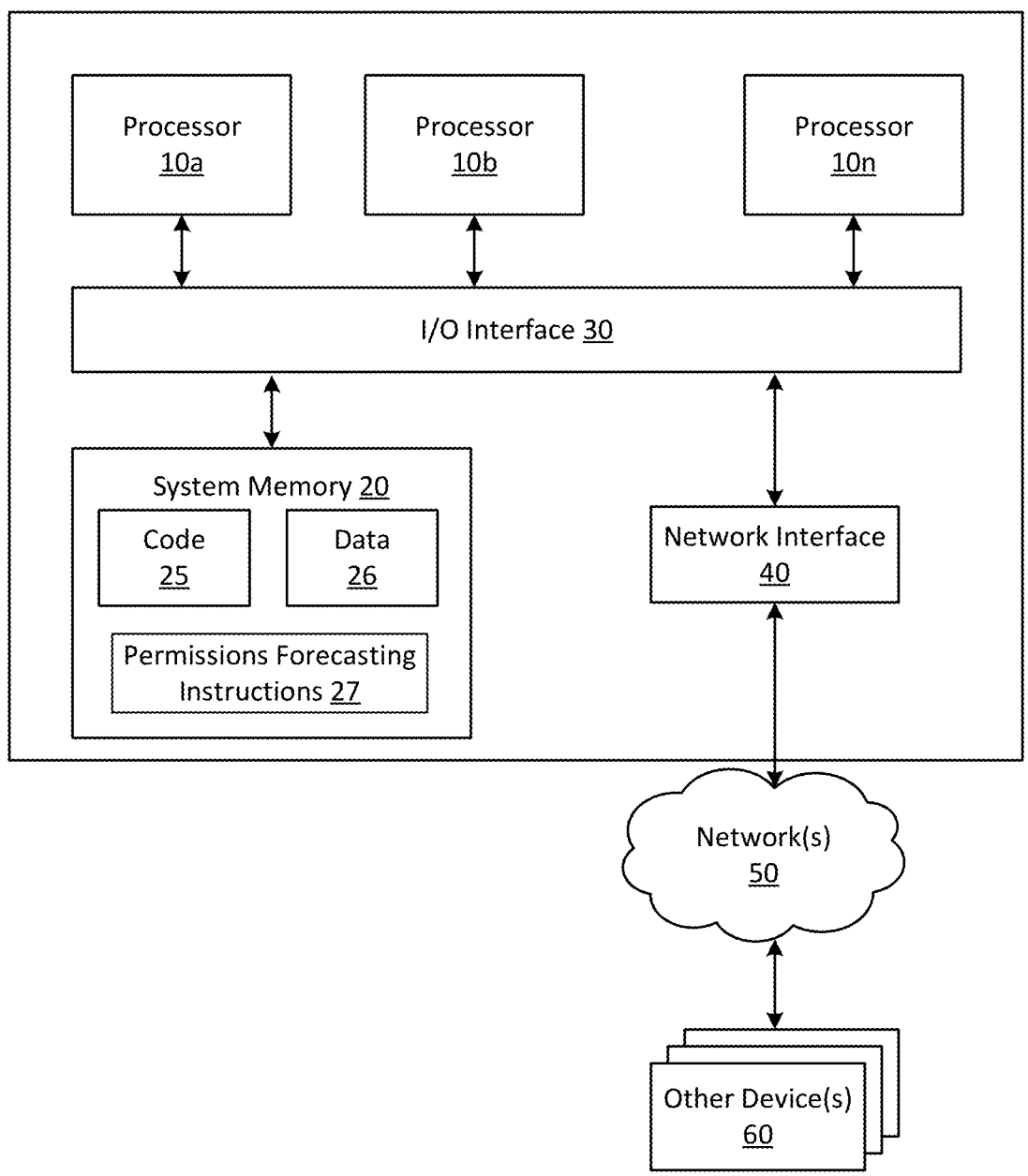
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes permissions forecasting instructions 27, which are instructions for executing any, or all, of the permissions forecasting techniques described herein, such as to assist in providing permissions recommendations (e.g., to retain or deallocate permissions) as described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
identifying at least a first permission allocated to a first identity managed by an identity management service;
analyzing permission usage information comprising a permission usage history of the first identity and permission usage pattern data;
forecasting, based at least in part on the permission usage information, an estimated probability of a future usage of the first permission by the first identity;
determining, based at least in part on a comparison of the estimated probability to a threshold probability, a first recommendation relating to allocation of the first permission to the first identity, wherein the first recommendation is a recommendation for the first identity to retain the first permission or a recommendation to deallocate the first permission from the first identity; and
providing an indication of the first recommendation to a user.

2. The computing system of claim 1, wherein the operations further comprise:
determining the permission usage pattern data based at least in part on a machine learning analysis of usage histories of a plurality of identities.

3. The computing system of claim 1, wherein the operations further comprise:
expressing the estimated probability using at least one of a percentage or a ratio.

4. The computing system of claim 1, wherein the operations further comprise:
detecting a change in usage behavior by the first identity; and
determining, based at least in part on the change in the usage behavior, to evaluate permissions recommendations for the first identity.

5. A computer-implemented method comprising:
identifying at least a first permission allocated to a first identity managed by an identity management service;
analyzing permission usage information comprising a permission usage history of the first identity and permission usage pattern data;
forecasting, based at least in part on the permission usage information, an estimated probability of a future usage of the first permission by the first identity;
determining, based at least in part on a comparison of the estimated probability to a threshold probability, a first recommendation relating to allocation of the first permission to the first identity; and
providing an indication of the first recommendation to a user.

6. The computer-implemented method of claim 5, wherein the first recommendation is a recommendation for the first identity to retain the first permission.

7. The computer-implemented method of claim 5, wherein the first recommendation is a recommendation to deallocate the first permission from the first identity.

8. The computer-implemented method of claim 5, further comprising:
making a second recommendation to delete the first identity based on an amount of deallocation recommendations for the first identity exceeding a threshold.

9. The computer-implemented method of claim 5, wherein the determining of the first recommendation comprises:
comparing the estimated probability to the threshold probability;
determining that the estimated probability is less than the threshold probability; and
determining to recommend deallocation of the first permission based at least in part on the estimated probability being less than the threshold probability.

10. The computer-implemented method of claim 5, wherein the determining of the first recommendation comprises:
comparing the estimated probability to the threshold probability;
determining that the estimated probability is greater than the threshold probability; and
determining to recommend retaining of the first permission based at least in part on the estimated probability being greater than the threshold probability.

11. The computer-implemented method of claim 5, further comprising:
determining a pattern of repeat usage of the first permission by the first identity; and
determining, based at least in part on the pattern of repeat usage, to recommend retaining of the first permission by the first identity.

12. The computer-implemented method of claim 5, further comprising:
determining that a second identity, which is related to the first identity, has used the first permission; and
determining, based at least in part on usage of the first permission by the second identity, to recommend retaining of the first permission by the first identity.

13. One or more non-transitory computer-readable storage media having stored thereon computing instructions that, upon execution by one or computing devices, cause the one or more computing devices to perform operations comprising:
identifying at least a first permission allocated to a first identity managed by an identity management service;
analyzing permission usage information comprising a permission usage history of the first identity;
forecasting, based at least in part on the permission usage information, an estimated probability of a future usage of the first permission by the first identity;
determining, based at least in part on a comparison of the estimated probability to a threshold probability, a first recommendation relating to allocation of the first permission to the first identity, wherein the first recommendation is a recommendation for the first identity to retain the first permission or a recommendation to deallocate the first permission from the first identity; and
providing an indication of the first recommendation to a user.

14. The one or more non-transitory computer-readable storage media of claim 13, wherein the permission usage information further comprises permission usage pattern data.

15. The one or more non-transitory computer-readable storage media of claim 14, further comprising:
determining the permission usage pattern data based at least in part on a machine learning analysis of usage histories of a plurality of identities.

16. The one or more non-transitory computer-readable storage media of claim 13, wherein the operations further comprise:
expressing the estimated probability using at least one of a percentage or a ratio.

17. The one or more non-transitory computer-readable storage media of claim 13, wherein the operations further comprise:
displaying last access information associated with a last access of the first permission by the first identity.

18. The one or more non-transitory computer-readable storage media of claim 13, wherein the operations further comprise:
Detecting a change in usage behavior by the first identity; and
determining, based at least in part on the change in the usage behavior, to evaluate permissions recommendations for the first identity.

19. The one or more non-transitory computer-readable storage media of claim 18, wherein the change in behavior comprises accessing, by the first identity, of a service that the first identity has not previously accessed.

20. The one or more non-transitory computer-readable storage media of claim 18, wherein the change in behavior comprises failing to use a permission at a repeating time interval.

* * * * *